March 27, 1962 A. WINKLER 3,026,783
AUTOMATIC CAMERA CONTROLS
Filed May 5, 1959 2 Sheets-Sheet 1

INVENTOR.
ALFRED WINKLER
BY
Michael S. Striker
Attorney

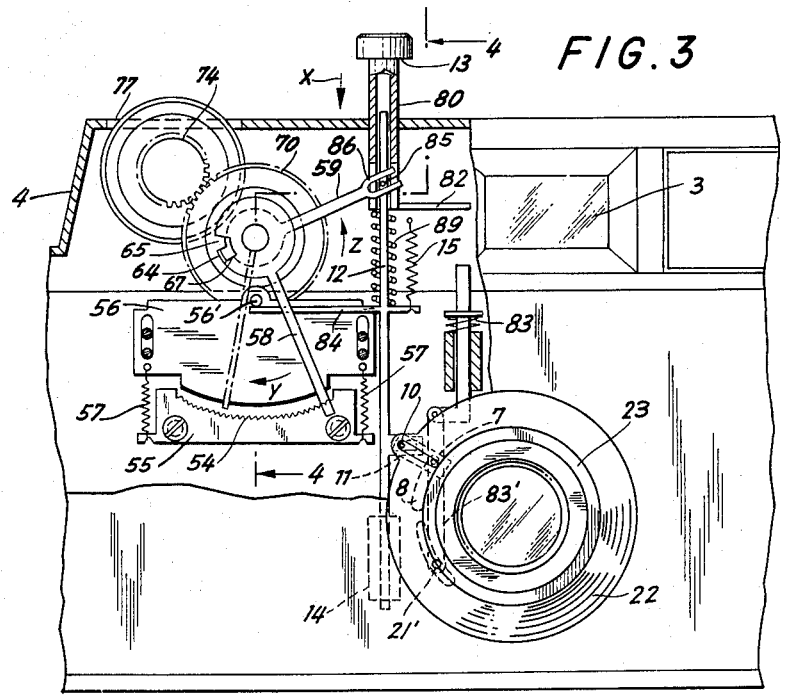

United States Patent Office 3,026,783
Patented Mar. 27, 1962

3,026,783
AUTOMATIC CAMERA CONTROLS
Alfred Winkler, Munich, Germany, assignor to Agfa Aktiengesellschaft, Leverkusen-Bayerwerk, Germany
Filed May 5, 1959, Ser. No. 811,155
Claims priority, application Germany May 10, 1958
11 Claims. (Cl. 95—10)

The present invention relates to cameras.

More particularly, the present invention deals with that part of a camera structure which controls the film exposure.

There are already known cameras which automatically provide proper exposure times and aperture sizes according to lighting conditions sensed by a light meter of the camera. However, with cameras of this type the light meter, and particularly the pointer thereof, is stressed by undesirably large forces of different magnitudes. Furthermore the translation of the light meter sensing into positioning of the camera parts requires in the known cameras complex structures which must be placed at only one location and which undesirably increase the size of the camera.

One of the objects of the present invention is to provide a camera structure of the above type wherein the structure which cooperates with the light meter cannot transmit undesirably large forces to any part of the light meter.

Another object of the present invention is to provide a structure of the above type which is exceedingly simple and compact.

A further object of the present invention is to provide a structure of the above type which can be placed at any convenient part of the camera so that the best possible use may be made of the available space in order to maintain the camera size at a minimum.

An additional object of the present invention is to provide in a structure of the above type an exceedingly simple transmission free of complex cams, gearing, and the like for translating the position of the light meter into proper setting of the camera.

Still another object of the present invention is to provide a camera of the above type with a simple, reliable adjustment according to the exposure index of the film which is used in the camera.

With the above objects in view the present invention includes, in a camera, a light meter means including an indicator automatically moved by the remainder of the light meter means to a location determined by the lighting conditions. A follower means is provided for following the indicator to a position determined by the particular location of the indicator of the light meter. A manually operable means is accessible to the operator, and a pair of slip clutch elements are respectively connected to the manually operable means and the follower means so that actuation of the manually operable means by the operator will produce movement of the follower means through the cooperating slip clutch elements. A spring means is operatively connected to the slip clutch elements to maintain the latter yieldably at predetermined positions with respect to each other while the slip clutch transmits movement of the manually operable means to the follower means without slipping of the slip clutch elements one with respect to the other. Once the follower means reaches the position determined by the location of the light meter indicator, the continued actuation of the manually operable means will cause one of the slip clutch elements to slip with respect to the other and the result will be increased stressing of the spring means during yielding. The structure of the invention includes, in addition to the above structure, a means which limits the extent to which the said one slip clutch element can slip with respect to the other slip clutch element so that the stressing of the spring means during slipping of the clutch is also limited and thus only a limited force can be transmitted from the follower means to the light meter structure.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 3 is a fragmentary, partly sectional front elevational view of the camera as seen when looking toward the front wall thereof, FIG. 3 illustrating the structure which controls the value of exposure time and aperture which are to be set into the camera to make the proper exposure; and FIG. 4 is a sectional elevational view taken along line 4—4 of FIG. 3 in the direction of the arrows.

Figure 1:
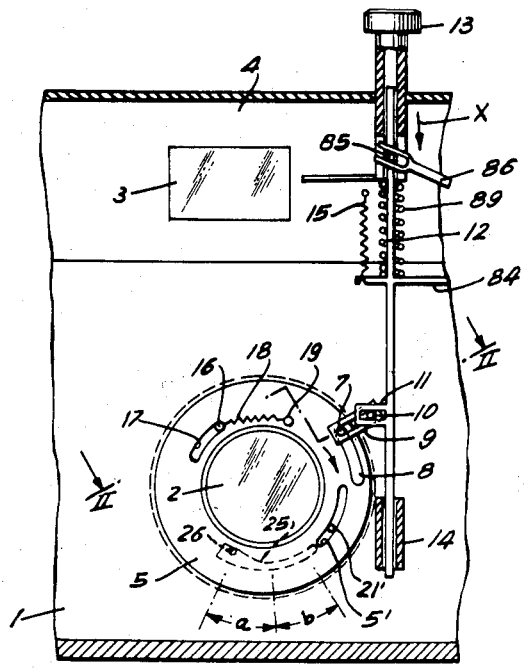
FIG. 1 is a partly schematic fragmentary illustration of a camera which includes the structure of the invention, the structure being shown in FIG. 1 as it appears when looking from the inside of the camera at the rear of the front wall thereof toward this front wall.
Figure 2:
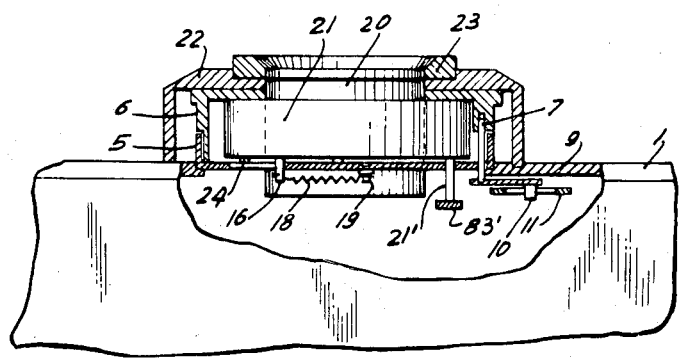
FIG. 2 is a fragmentary partly sectional top plan view of the structure of FIG. 1.

The structure of the present invention is illustrated in FIGS. 3 and 4, the structure of FIGS. 1 and 2 being included in the application only for the purpose of affording a full understanding of the invention.

Referring now to FIGS. 1 and 2, the camera illustrated therein includes a camera housing made up in part of the front wall 1 of the camera. The objective 2 is carried by the front wall 1, and the camera is provided with an upper part 4 where the view finder 3 is located. Thus, as is shown most clearly in FIG. 2, the front wall 1 of the camera fixedly carries a tubular housing 22 which forms the outer casing of the objective, this objective further including a lens housing 20 capable of being shifted in a known way along the optical axis by turning of the focussing ring 23 schematically shown in FIG. 2. Surrounding the lens housing 20 is a stationary annular shutter housing 21 in which the shutter and diaphragm controlling structure are located, as is conventional, and in which structure for controlling the exposure time is also located, as is conventional.

The structure of the camera includes an aperture adjusting means, and this aperture adjusting means is made up, in part, of the rotary ring 5 which is directly supported by the front wall 1 for turning movement around the optical axis, the latter passing through the center of the ring 5. It will be noted that the ring 5 has a rear wall located in a plane normal to the optical axis and a cylindrical flange extending forwardly from this rear wall at the outer edge of the latter. This cylindrical flange of the rotary aperture adjusting ring 5 serves to guide the coaxial ring 6 for turning movement, this ring 6 forming part of the exposure time adjusting structure of the camera, so that the aperture adjusting means and the exposure time adjusting means respectively include the rotary rings 5 and 6 which are coaxial with each other as well as with the optical axis. The ring 6 is turnable independently of the ring 5.

A pin 7 which extends parallel to the optical axis is fixed to and extends rearwardly from the ring 6 through an arcuate slot 8 formed in the rear wall of the ring 5, this arcuate slot 8 having a predetermined length and having its center in the optical axis. A plate 9 which is located at the exterior of the rings 5 and 6 within the camera just behind the wall 1 is fixed to and extends from the pin 7, and this plate 9 fixedly carries at its end distant from the pin 7 a pin 10 which also extends parallel to the optical axis, this pin 10 extending through a slot 11 formed in a lateral extension of a vertical rod 12, as is shown most clearly in FIG. 1. The parts 7 and 9 may be integral with each other and formed by an angularly bent piece of metal, for example, and, if desired, the pin 10 may also be integral with the part 9 and may form an angularly bent portion of a single piece of metal.

A manually engageable shutter release plunger 13 is movable by the operator downwardly, as viewed in FIG. 1, and this member 13 is formed with a tubular extension 80 (FIG. 3) in which the upper portion of the rod 12 is axially slidable. This rod 12 fixedly carries an extension connected to one end of a return spring 15 the other end of which is fixed to a stationary member of the camera so that the spring 15 urges the rod 12 to the rest position thereof illustrated in FIG. 1. A tubular guide 14 is also carried by the camera in the interior thereof for guiding the rod 12 for axial movement.

The stationary shutter housing 21 fixedly carries a pin 16 (FIGS. 1 and 2) which extends parallel to the optical axis rearwardly from the housing 21, and the stationary pin 16 extends through the arcuate slot 17 formed in the rear wall of the ring 5, this slot 17 also extending along a circle whose center is in the optical axis. A spring 18 is connected at one end to the stationary pin 16 and at an opposite end to a pin 19 which is fixed to and extends rearwardly from the ring 5, so that the spring 18 urges the ring 5 in a counterclockwise direction, as viewed in FIG. 1, to the starting position illustrated in FIG. 1, where the right end of the slot 17, as viewed in FIG. 1, is urged against the stationary pin 16 by the spring 18. Thus, the spring 18 serves as a spring means which urges the aperture adjusting means to its rest or starting position determined by the position of the stationary pin 16 and the right end of the slot 17, as viewed in FIG. 1, and the spring 15 operates as a spring means cooperating with the exposure time adjusting means to urge the latter to a rest or starting position determined by engagement of the pin 7 with the upper end of the slot 8, as viewed in FIG. 1. The spring means 15 acts through the manually operable means 12, 13, the pin-and-slot connection 10, 11 and the plate 9 on the pin 7. Inasmuch as the angular position of the ring 5 when the latter is in its starting position is determined by the pin 16 and slot 17, the slot 8 will have a given angular position at this time so that the pin 7 by cooperation with the upper end of slot 8 provides a determined angular position for the ring 6 so as to provide a given starting position for the exposure time adjusting means. Because of the pin-and-slot connection 7, 8 as well as the pin-and-slot connection 16, 17 both the exposure time and the aperture size are continuously, steplessly adjustable through their entire range of adjustments, so that for both the exposure time and the aperture it is possible to provide an infinite number of settings.

The manually operable rod 12 cooperates with a light meter and additional structure shown in FIGS. 3 and 4 for the purpose of determining the setting of both the exposure time and the aperture. This structure is described below in connection with FIGS. 3 and 4. In the position of the parts illustrated in FIG. 1, the exposure time adjusting means is set for the longest exposure time and the aperture adjusting means is set for the largest aperture. Preferably the maximum exposure time is chosen so as to provide no lack of quality in the photographs resulting from slight unsteadiness of the operator.

The structure of FIGS. 1 and 2 operates in the following manner:

Once the subject is viewed through the view finder 3 so that an exposure is to be made, the operator depresses the plunger 13 moving the latter downwardly in the direction of the arrow X, and this releases the light meter structure, as is described below, so as to determine the light values which are to be set into the camera. As will be apparent from the description which follows, in connection with FIGS. 3 and 4, the extent to which the rod 12 can be moved downwardly is automatically determined by the light meter and its associated structure. At the beginning of the depression of the plunger 13, the latter will act on a spring 89 surrounding the rod 12 and engaging the bottom end of the sleeve 80 as well as the extension of the rod 12 to which the spring 15 is fixed. Thus, depression of the plunger will cause the sleeve 80 to compress the spring 89 and through the latter to move the rod 12 downwardly until this downward movement of the rod 12 is automatically stopped in the manner described below. During the initial part of the downward movement of the rod 12 as a result of actuation of the plunger 13 by the operator, the pin-and-slot connection 10, 11 acts through the plate 9 and the pin 7 to turn the ring 6, so as to adjust the exposure time, and it will be noted that during this initial movement of the rod 12 and turning of the pin 7 and the ring 6 therewith there is no movement of the aperture adjusting means, the pin 7 simply moving along the stationary slot 8. It is apparent that during the initial part of the downward movement of the rod 12, the pin 7 together with the exposure time adjusting ring 6 will turn in a clockwise direction, as viewed in FIG. 1. As is apparent from FIG. 1, the ring 6 is formed in its front wall with an elongated arcuate cutout having an upper camming edge 25 engaging a pin 26 of the shutter housing 21 to move the pin 26 radially during turning of the ring 6 for the purpose of adjusting the exposure time in a known way. For example, reference may be had to U.S. patent 2,448,876 which shows in FIG. 22 a similar camming edge cooperating with a pin for adjusting the exposure time. As is apparent from FIG. 1, the pin 26 will be radially moved during turning of the ring 6 only while the portion a of the edge 25 engages the pin 26. The portion b of the edge 25 extends along a circle whose center is in the turning axis of the ring 6, so that when the portion b of the edge 25 engages the pin 26 the latter will not be moved radially and the exposure time will remain unchanged. The structure is designed so that when the pin 7 reaches the bottom end of the slot 8, the right end, as viewed in FIG. 1, of the edge portion a of the edge 25 will have engaged the pin 26 so that when the pin 7 moves beyond the point where it first engages the bottom end of the slot 8, there will be no further change in the exposure time, since at this time the portion b of the edge 25 will engage the pin 26. It will also be noted that during turning of the ring 6 with respect to the ring 5 while the pin 7 moves along the slot 8 and the portion a of the edge 25 engages the pin 26, the exposure time is being adjusted in a stepless gradual continuous manner so that within the given range of exposure time adjustments there are an infinite number of settings of the exposure time with this construction.

If the lighting conditions are such that the downward movement of the rod 12 is automatically stopped, in the manner described below in connection with FIGS. 3 and 4, before the pin 7 reaches the bottom end of the slot 8, then the exposure will be made at the largest aperture size and with the exposure time determined by the extent of turning of the ring 6. As was pointed out above, when the parts are in the rest position shown in FIG. 1, they are set at the longest exposure time and the largest aperture, and during the initial downward movement of the rod 12 only the ring 6 is turned while the ring 5 remains stationary, so that until the pin 7 engages the bottom end of the slot 8 the aperture is at its largest size and remains at this adjustment while the exposure time becomes gradually smaller.

On the other hand, if there is so much light available that even when the pin 7 reaches the bottom end of the slot 8 so as to provide the smallest exposure time there is still too much light for a proper exposure, then the rod 12 will not be stopped and it will continue to move downwardly, so that from this point on the ring 5 will turn together with the ring 6 due to the engagement of the pin 7 with the bottom end of the slot 8, as viewed in FIG. 1, and the exposure time will remain unchanged at its smallest value while the aperture size will start to diminish. Thus, during adjustment of the aperture size, by turning of the ring 5, the exposure time remains unchanged at its smallest value, and of course, at this time the pin 19 moves with the ring 5 so that the spring 18 becomes elongated and tensioned, and the slot 17 moves around the pin 16 with the left end of the slot 17, as viewed in FIG. 1, approaching the pin 16. The rod 12 will be automatically stopped when the proper combination of aperture size and exposure time is provided, and then the continued downward movement of the plunger 13 by the operator will cause the exposure to be made, in the manner described below.

After the exposure is made the operator releases the plunger 13, and the spring 15 returns the rod 12 to its starting position while the spring 89 returns the plunger 13 to its starting position, and of course the return of the rod 12 to its starting position causes the ring 6 to be returned to its starting position, and the spring 18 acts on the ring 5 to return the latter to its starting posiion illusrated in FIG. 1.

It will thus be seen that with the above-described structure of FIGS. 1 and 2, the operator need not make a selection either of the exposure time or of an aperture size, since both of these values are automatically determined.

Referring now to FIGS. 3 and 4, there is shown most clearly in FIG. 4 the housing 52 of the electrical instrument which indicates the intensity of the light, this instrument being, for example, a galvanometer having a turnable rotor coil located within the housing 52. The rotor of the instrument fixedly carries a pointer 53 which assumes an angular position indicative of the intensity of the light, in a well known manner. Thus, the galvanometer may be electrically coupled to a photoelectric cell to be actuated when light is received by the cell. The pointer 53 is capable of being held in the position in which it becomes located as a result of the light intensity. For this purpose the pointer 53 has a bottom end which extends forwardly in a direction parallel to the optical axis, as is apparent from FIG. 4, and this bottom end of the pointer 53 extends through a gap 54 formed between a stationary element 55 and a vertically movable element 56, the element 56 being movable downwardly from the position shown in FIGS. 3 and 4 for clamping the bottom end of the pointer 53 to maintain the latter in the position to which it has turned as a result of the light intensity. As is apparent from FIGS. 3 and 4 the movable clamping plate 56 is formed with parallel slots through which stationary pins extend to guide the plate 56 for vertical movement, and springs 57 are connected at one end to the stationary plate 55 and at their opposite end to the plate 56 to urge the latter downwardly to the clamping position. In front of the clamping plates 55 and 56 is located a follower pointer 58 which turns, in a manner described below, after the pointer 53 in the direction of the arrow Y shown in FIG. 3. The bottom end of the pointer 53 extends forwardly beyond the lower portion of the pointer 58, so that the bottom end of the pointer 53 is located in the path of turning movement of the pointer 58, and therefore the latter turns until it engages the pointer 53, so that the angular position of the pointer 53 determines the angular position of the pointer 58.

The pointer 58 is turned by a lever 59 which is connected with the pointer 58 through a friction clutch assembly. This friction clutch assembly includes an inner slip clutch member 60 fixed to the follower means 58 and provided with an outer threaded surface. The inner member 60 is formed with an axial bore through which a support pin 61 passes so that the member 60 is supported for turning movement around its axis, this pin 61 forming the axis of turning of the follower means 58, and it will be noted that this axis of turning of the follower means 58 coincides with the axis of turning of the light meter indicator 53. The pivotal support 61 is fixedly carried by a stationary plate 62 in the interior of the camera. The outer threads of the inner member 60 threadly cooperate with the inner threads of an outer slip clutch member 63 which is fixedly connected with the lever 59, the latter extending radially from the outer member 63 which surrounds and threadedly engages the inner member 60. This outer member 63 has fixed thereto a forwardly extending projection 64 which extends into a cutout 65 formed in the hub portion of the pointer 58, this cutout 65 extending through a predetermined arc around the center of the pointer 58, as is most clearly shown in FIG. 3.

A spiral spring 66 concentrically surrounds the members 63 and 60, and one end of the spring 66 is fixed to the member 63 while the other end of the spring 66 is fixed to the pointer 58, so that element 66 forms a yieldable spring means yieldably maintaining the slip clutch elements at a given angular position relative to each other. The spring is tensioned so that it urges the pointer 58 in a counterclockwise direction, as viewed in FIG. 3, so that the bottom end of the cutout 65 is in this way maintained in engagement with the projection 64. With the parts in the position shown in FIG. 3, the spring 66 is under a relatively light pretension which is the minimum tension remaining at all times in the spring so as to maintain the parts in the position where projection 64 engages the cutout 65 at the bottom edge thereof, as viewed in FIG. 3, when the parts are at rest. Thus, FIG. 3 shows the projection 64 engaging the edge 67 which form the lower limit of the cutout 65.

The member 63 is formed at its right end, as viewed in FIG. 4, with an outwardly directed annular flange 69 which forms an annular friction surface of the friction clutch adapted to cooperate with the stationary plate 62. The inner member 60 of the friction clutch is fixed at its left end, as viewed in FIG. 4, to a ring 68 which prevents the members 60 and 63 sliding from the support pin 61.

The housing 52 of the electrical instrument is capable of being angularly set in accordance with the particular index of the film which is used in the camera. Thus, as is well known, different films have different sensitivities which are indicated by the exposure index of the film. For the purpose of angularly setting the position of the housing 52 according to the particular exposure index of the film used in the camera, the housing 52 is fixed within a ring 71 which is in turn fixedly carried by a gear 70. The gear 70 is itself fixedly connected with a coaxial bearing pin 72 which is supported for turning movement in a stationary bearing 73. The gear 70 meshes with a gear 74 which is fixed coaxially to a knurled ring 75 which extends through a cutout 77 to the exterior of the camera, so that the operator may turn the ring 75 so as to turn the gear 74 and in this way turn the gear 70 and the instrument housing 52. Between the gear 74 and the manually engageable ring 75 and fixed both to the gear 74 as well as to the ring 75 is a cylindrical member 76 carrying a scale of exposure indexes, this scale also extending through the opening 77 of the upper part 4 of the camera to the exterior of the latter so that the exposure indexes can be aligned with a stationary index 78 carried by the member 4 at the exterior of the camera, and in this way the operator is capable of determining the angular position of the instrument 52 in accordance with the particular exposure index of the film which happens to be used. The instrument 52 is furthermore so designed that within the range thereof which corresponds to the light values at which exposures are actually made the instrument will have a substantially linear characteristic.

As is apparent from FIG. 3, there is illustrated therein the manually engageable plunger 13 together with its tubular extension 80 which extends downwardly and which slidably receives in its interior the upper portion of the rod 12, this rod 12 being surrounded just beneath the tubular portion 80 of the plunger by the spring 89 which is coiled around the rod 12 and which engages with its top end the bottom end of the sleeve 80 and with its bottom end the extension of the rod 12 to which the spring 15 is connected. As is shown in FIG. 3, the sleeve 80 fixedly carries at its bottom end a projection 82 extending radially from the sleeve 80 and located over a shutter release member 83 so that when the plunger 13 is depressed by the operator through a sufficient distance the projection 82 will engage the element 83 to move the latter downwardly in order to release the shutter and make the exposure in a known way. The member 83 is maintained at the elevation shown in FIG. 3 by a light spring in the manner shown diagrammatically in FIG. 3, and at its bottom end the member 83 is pivotally connected to the top end of a member 83' whose bottom end is connected directly with a pin 21' the movement of which releases the shutter in a well known manner. As may be seen from FIGS. 1 and 2, the pin 21' extends from the shutter housing 21 through an arcuate slot 5' formed in the ring 5, and the pin 21' is connected to the element 83' at the rear of the ring 5, as shown most clearly in FIG. 2, so that in this way the shutter can be actuated by depression of the plunger 13 and at the same time due to the length of the slot 5' there is no interference between the setting of the aperture or exposure time and the actuation of the shutter release. The length of the slot 5' is such that it is at least as long as the slot 17 and that during thet entire turning of the ring 5 by engagement of the pin 7 with the bottom end of the slot 8 the pin 21' is never engaged by the ring 5 and can only be operated by downward movement of the element 83.

The rod 12 additionally carries a lateral extension 84 which extends beneath a forwardly projecting pin 56' of the movable clamping plate 56. Thus, when the spring 15 holds the rod 12 in its illustrated rest position, it also acts through the extension 84 and the pin 56' to maintain the plate 56 in opposition to the springs 57 at the elevation shown in FIG. 3 where the pointer 53 is free to turn.

The sleeve 80 of the pointer 13 is formed in a front portion thereof with a vertically extending slot through which extends a pin 85 which is fixed to the rod 12, and this pin 85 is received in the bifurcated free end portion 86 of the lever 59, so that vertical movement of the rod 12 is translated into turning movement of the lever 59 which acts through the above-described friction clutch structure on the pointer 58 in a manner described below. Thus, the plunger 13, spring 89, rod 12, pin 85, and lever 59 form a manually operable means accessible to the operator and acting through the slip clutch means to move the follower means 58.

As was pointed out above, when the operator of the camera has the camera properly aimed at a subject the image of which is seen in the view finder, the operator engages the plunger 13 and moves the latter downwardly in the direction of the arrow x shown in FIGS. 1 and 3. This downward movement of the plunger 13 causes the spring 89 to become compressed between the bottom end of the sleeve 80 and the transverse extensions of the rod 12 one of which is connected to the spring 15 and the other of which is the extension 84 which cooperates with the plate 56. Thus, during the initial downward movement of the plunger 13 the rod 12 will also move downwardly, and in addition to the actions taking place as described above in connection with FIGS. 1 and 2, the extension 84 will move downwardly so as to release the clamping plates 56 for downward movement under the action of the springs 57. Of course, the light meter of the camera is operating at this time and if necessary before the camera is used the operator uncovers the window of the light meter so that the light meter will respond to the light which is received by the camera. Thus, even before the operator starts to depress the plunger 13 the pointer 53 of the meter is already in a position which is determined by the light intensity. Therefore, when the operator depresses the plunger 13, at the initial part of the downward movement of the rod 12 the clamping plate 56 moves downwardly and the pointer 53 becomes clamped at its bottom end between the stationary plate 55 and the movable plate 56 so that the pointer 53 is restrained against movement. Thus, the clamping means 55, 56 serves to hold the pointer 53 in an angular position determined by the lighting conditions.

During the initial part of the downward movement of the rod 12, in addition to the above-described setting of the exposure time and aperture size as well as the clamping of the pointer 53, the pin 85 cooperates with the lever 59 through the bifurcated portion 85 of the latter to turn the lever 59 and thus turn the member 63. During the initial turning of the member 63, there are no restraints on the friction clutch assembly, so that this entire assembly turns as a unit with the member 59, and thus the pointer or follower means 58 turns in the direction of the arrow Y of FIG. 3 toward the pointer or light meter indicator 53. The parts are so designed that the pointer 53 will always be clamped by the plates 55 and 56 before the pointer 58 reaches the range in which the pointer 53 turns. Therefore, by the time the pointer 58 approaches more closely to the pointer 53, the latter will have been clamped and thus retained in its angular position. The continued downward movement of the rod 12 causes the arm 59 to continue turning, and this operation continues until the pointer 58 engages the pointer 53, so that the pointer 58 cannot turn further. The arm 59 continues to turn, however, and the element 63 turns therewith. However, at this time the inner member 60 of the friction clutch is maintained stationary with the pointer 58 which is in engagement with the pointer 53. Therefore the element 63 now turns relative to the element 60, and as a result of the threaded connection between the elements 60 and 63 the latter element advances to the right, as viewed in FIG. 4, through a very slight distance into engagement with the plate 62, the angular length of the cutout 65 being more than sufficient to provide turning of element 63 relative to element 60 into engagement with the stationary plate 62, and in this position of the parts the arm 59 together with the element 63 cannot turn further. Of course, during the turning of the element 63 relative to the element 60 the spring 66 becomes tensioned to a greater degree, but this relative turning of the element 63 is relatively slight and the spring itself is relatively weak so that there is no substantial force applied to the pointer 53 of the light meter. Therefore, plate 62 forms at its portion engaged by flange 69 a limiting means limiting the extent to which the friction clutch can slip and therefore limiting the tensioning of spring means 66 so as to limit the forces transmitted to the pointer 53. The parts are carefully designed so that when the element 63 engages the plate 62 so as to be prevented from further turning the rod 12 will be in a vertical position which reflects the angular position in which the pointer 53 is clamped, so that the vertical position of the rod 12 when the element 63 engages the plate 62 is in correspondence with the lighting conditions, and thus the setting of the exposure time and aperture according to the vertical position of the rod 12 will provide the proper exposure of the film. In this way the position of the rod 12 is automatically determined in accordance with the lighting conditions so that in this way both the exposure time and the aperture size are properly set. Since the element 63 cannot turn further the arm 59 cannot turn further and the rod 12 cannot continue to move down. However, the operator can continue the downward movement of the plunger 13, the spring 89 becoming compressed to a greater degree at this time, and this downward movement of the plunger 13 and the sleeve 80 continues until the projection 82 of the sleeve 80 engages the top end of the element 83 to depress the latter and release the shutter in the manner described above. Thus, as the result of the spring 89, it is possible for the plunger 13 and the sleeve 80 therewith to be moved downwardly by the operator at each exposure through the same distance while at the same time the rod 12 is moved downwardly through a distance which depends upon the particular lighting conditions.

After the exposure is made the operator releases the plunger 13 and the several return springs return the parts to their positions of rest. Thus, the spring 15 will raise the rod 12 so that the exposure time and aperture are again automatically set at their larger values, and the rod 83 is returned by its spring to its position of rest so that the shutter is again ready to be actuated. Also, the upward movement of the rod 12 acts on the arm 59 to turn the latter in the direction of the arrow Z of FIG. 3. During the initial part of the return movement of the arm 59 as the result of the upward movement of the rod 12 and the pin 85 therewith, the element 63 turns away from the wall 62, the pointer 58 still being maintained at this time in engagement with the pointer 53 which is still clamped between the plates 55 and 56, the spring 66 acting to maintain the pointer 58 in this position at this time. However, as soon as the arm 59 and element 63 turn through the relatively short distance required to place the projection 64 in engagement with the edge 67 of the cutout 65, the entire friction clutch assembly turns as a unit in the direction of the arrow Z of FIG. 3, so as to move the pointer 58 away from the pointer 53 in a counterclockwise direction, as viewed in FIG. 3, and shortly thereafter the upwardly moving rod 12, now moving upwardly under the influence of the spring 15, causes the extension 84 of the rod 12 to engage the pin 56' so as to raise the plate 56 in opposition to the springs 57, and now the pointer 53 is free to turn in the gap between the plates 55 and 56 according to any changes in the light intensity. Thus, all of the parts are again at their starting position and when the next film frame is properly positioned the next exposure may be made in the above-described manner. Of course, whenever the angular position of the scale 76 does not correspond to the exposure index of the film which is placed in the camera, the element 75 is turned so as to place the scale 76 in the proper angular position, and this will result in turning of the instrument housing 52 as well as the pointer 53 to take into account the particular exposure index of the film which is placed in the camera.

It will be seen that the above-described structure of FIGS. 3 and 4 provides an arrangement where the pressure with which the follower pointer 58 bears against the light meter pointer 53 is always maintained at a relatively low value so that there is no undesirable stressing of the pointer of the light meter. Furthermore, because of the coaxial arrangement of the pointers 53 and 58 and because of the linear characteristic of operation of the instrument 52 in the range covered by the pointer 53 when the latter registers different picture-taking light values, the structure is considerably simplified and requires no special cam drives or the like which are of complex construction. The structure is extremely compact as well as simple and furthermore the structure of the invention need not be arranged along the optical axis and can instead be located at any convenient part of the camera, this structure being located to the left of and at a higher elevation than the objective in the particular example illustrated, as is evident from FIG. 3.

It will be understood that each of the elements described above, or two or more together, may also find a useful application in other types of cameras differing from the types described above.

While the invention has been illustrated and described as embodied in exposure control arrangements for cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, light meter means including an indicator automatically moved by the remainder of the light meter means to a location indicative of the lighting conditions; follower means for following said indicator to a position determined by said indicator; a pair of slip clutch elements one of which is connected with said follower means to move with the latter; spring means cooperating with said slip clutch elements for maintaining the latter at a predetermined position with respect to each other until the other of said slip clutch elements moves with respect to said one slip clutch element after said follower means reaches said position; manually movable means operatively connected to said other element for moving both of said slip clutch elements until said follower means reaches said position and for then moving only said other slip clutch element while tensioning said spring means; and limiting means cooperating with said other slip clutch element for limiting the movement of the latter with respect to said one slip clutch element to a predetermined extent of movement each time said manually movable means is actuated so as to limit tensioning of said spring means and thus limit the pressure with which said follower means engages said indicator of said light meter means.

2. In a camera, in combination, light meter means including an indicator automatically moved by the remainder of the light meter means to a location indicative of the lighting conditions; follower means for following said indicator to a position determined by said indicator; a pair of slip clutch elements one of which is connected with said follower means to move with the latter; spring means cooperating with said slip clutch elements for maintaining the latter at a predetermined position with respect to each other until the other of said slip clutch elements moves with respect to said one slip clutch element after said follower means reaches said position; manually movable means operatively connected to said other element for moving both of said slip clutch elements until said follower means reaches said position and for then moving only said other slip clutch element while tensioning said spring means; and limiting means cooperating with said other slip clutch element for limiting the movement of the latter with respect to said one slip clutch element so as to limit tensioning of said spring means, said slip clutch elements being threadedly connected to each other so that said other slip clutch element turns with respect to said one slip clutch element and moves axially with respect to the latter during slipping of said other slip clutch element with respect to said one slip clutch element.

3. In a camera, in combination, light meter means including an indicator automatically moved by the remainder of the light meter means to a location indicative of the lighting conditions; follower means for following said indicator to a position determined by the indicator; an inner slip clutch element connected to said follower means for moving the latter; a stationary pin supporting said inner element for turning movement around said pin, said inner element having an outer threaded surface; an outer clutch element surrounding and threadedly engaging said inner element; spring means cooperating with said clutch elements for maintaining the latter at a predetermined angular position with respect to each other; and manually operable means cooperating with said outer element for turning the latter, said inner element turning with said outer element until said follower means reaches said position whereupon said outer element continues to turn with respect to said inner element which remains stationary and tensions said spring means; and limiting means located in the path of axial movement of said outer element for limiting the extent of turning thereof with respect to said inner element so as to limit the tensioning of said spring means during movement of said outer element with respect to said inner element.

4. In a camera, in combination, light meter means including an indicator automatically moved by the remainder of the light meter means to a location determined by the lighting conditions; follower means for following said indicator to a position determined by the latter; a driven slip clutch member connected to said follower means to move the latter; a driving slip clutch member frictionally engaging said driven member, one of said slip clutch members having a projection and the other of said slip clutch members having a stop portion; spring means cooperating with said slip clutch members for maintaining said projection in engagement with said stop portion so as to maintain said slip clutch members in a predetermined position with respect to each other; manually operable means operatively connected to said driving slip clutch member for moving the latter and said driven slip clutch member therewith until said follower means reaches said position, continued movement of said manually operable means after said follower means reaches said position producing slipping of said driving slip clutch member with respect to said driven slip clutch member to tension said spring means and to move said projection away from said stop portion; and limiting means located in the path of movement of said driving clutch member when the latter moves with respect to the driven clutch member to limit the movement of said driving clutch member and thus limit the tensioning of said spring means.

5. In a camera as recited in claim 4, said driving and driven clutch members being coaxially arranged with respect to each other and turnable one with respect to the other and said spring means being in the form of a spiral spring having opposite ends respectively connected with said clutch members.

6. In a camera, in combination, support means; rod means supported for axial movement by said support means and actuating structure which controls the extent to which film is exposed; manually operable means coaxial with said rod means and also movable along the axis of said rod means with respect to the latter; control means cooperating with said rod means for stopping the movement thereof when the camera has been set to make a proper exposure; and spring means cooperating with said rod means and manually movable means for transmitting movement of the latter to said rod means until the latter is stopped by said control means and then permitting continued movement of said manually operable means to actuate a shutter of the camera so as to make an exposure.

7. In a camera, in combination, support means; elongated rod means supported for axial movement by said support means and actuating structure of the camera which controls the extent to which film in the camera is exposed; control means cooperating with said rod means for automatically stopping the movement thereof at a position which will give a proper exposure; a manually movable sleeve telescopically receiving a portion of said rod means and axially movable with respect to the latter; and spring means cooperating with said sleeve and said rod means for transmitting movement of said sleeve to said rod means until the latter is stopped by said control means, said spring means then yielding during continued movement of said sleeve by the operator.

8. In a camera, in combination, support means; elongated rod means supported for axial movement by said support means and actuating structure of the camera which controls the extent to which film in the camera is exposed; control means cooperating with said rod means for automatically stopping the movement thereof at a position which will give a proper exposure; a manually movable sleeve telescopically receiving a portion of said rod means and axially movable with respect to the latter; and spring means cooperating with said sleeve and said rod means for transmitting movement of said sleeve to said rod means until the latter is stopped by said control means, said spring means then yielding during continued movement of said sleeve by the operator; and second spring means cooperating with said rod means for returning the latter to a predetermined rest position.

9. In a camera, in combination, support means; rod means supported for axial movement by said support means, said rod means actuating structure which controls the extent of exposure of film in the camera; control means cooperating with said rod means for automatically stopping the latter at a position which will determine the extent of exposure of film in the camera; manually operable means coaxial with said rod means and axially movable with respect thereto; spring means cooperating with said manually movable means and said rod means for transmitting movement of said manually movable means to said rod means to move the latter until the latter is stopped by said control means, said spring means then yielding during continued movement of said manually movable means; shutter release means carried by said support means; and a projection carried by said manually movable means and movable into engagement with said shutter release means to actuate the latter to release the shutter during the continued movement of said manually movable means after said rod means has stopped moving.

10. In a camera according to claim 1, said indicator being movable through a given range for actual picture taking and said light meter having a substantially linear characteristic during movement of said indicator in said range.

11. In a camera, in combination, light meter means including a rotary indicator turnable about a predetermined axis and moved by the remainder of the light meter means to an angular position corresponding to the lighting conditions; a follower coaxial with said indicator and turnable about the same axis that said indicator turns about; manually movable means; slip clutch means connecting said manually movable means to said follower to move the latter until it engages said indicator whereupon said slip clutch means slips; spring means cooperating with said slip clutch means for maintaining the latter in a given rest position and being tensioned during slipping of said slip clutch means; and limiting means cooperating with said slip clutch means for limiting the extent to which the latter slips so as to limit the tensioning of the spring means and thus limit the pressure with which said follower engages said indicator of said light meter means.

References Cited in the file of this patent

UNITED STATES PATENTS

| | | |
|---|---|---|
| 2,148,963 | Rauch | Feb. 28, 1939 |
| 2,188,820 | Riszdorfer | Jan. 30, 1940 |
| 2,250,898 | Tonnies | July 29, 1941 |
| 2,325,463 | Axler | July 27, 1943 |
| 2,897,720 | Offner | Aug. 4, 1959 |
| 2,906,166 | Herterich | Sept. 29, 1959 |